United States Patent [19]
Kürger et al.

[11] 3,756,376
[45] Sept. 4, 1973

[54] GRAVITY-TYPE ROLLER CONVEYOR WITH ROLLER DRIVING AND ROLLER BRAKE DEVICES

[75] Inventors: Kurt S. Kürger, Offenbach/M.; Norbert F. Axmann, Seligenstadt, both of Germany

[73] Assignee: Stohr Forderanlagen Salzer & Co. GmbH, Offenbach am Main, Germany

[22] Filed: Aug. 5, 1970

[21] Appl. No.: 61,301

[52] U.S. Cl. .............................................. 198/127 R
[51] Int. Cl. ............................................. B65g 13/02
[58] Field of Search ................................. 198/127 R

[56] References Cited
UNITED STATES PATENTS

| | | | |
|---|---|---|---|
| 2,129,510 | 9/1938 | Taylor | 198/127 R |
| 2,194,219 | 3/1940 | Eggleston | 198/127 R |
| 2,622,720 | 12/1952 | Lorig | 198/127 R |
| 3,127,003 | 3/1964 | Goepper | 198/127 R |
| 3,537,568 | 11/1970 | Leach | 198/127 R |

*Primary Examiner*—Edward A. Sroka
*Attorney*—McGlew and Toren

[57] ABSTRACT

A gravity-type roller conveyor includes at least a section thereof in which the rollers are driven by driving members or drivers carried on an endless conveyor belt. The drivers which contact the individual rollers are dimensioned so that their longitudinal width of their outer ends which engage the rollers is less than the spacing between the center lines of the rollers. The conveyor also advantageously includes a braking mechanism in the form of a distance plate or engagement member which is shifted into engagement with a plurality of adjacent rollers along the length of the roller conveyor under the control of an electrical actuating circuit which is energized by a control roller which is located ahead of and/or after the braking device.

23 Claims, 6 Drawing Figures

PATENTED SEP 4 1973 3,756,376

Inventors
KURT KRÜGER
NORBERT AXMANN

BY
McGlew & Toren
ATTORNEYS

GRAVITY-TYPE ROLLER CONVEYOR WITH ROLLER DRIVING AND ROLLER BRAKE DEVICES

SUMMARY OF THE INVENTION

This invention relates in general to the construction of roller conveyors, and in particular, to a new and useful gravity-type roller conveyor having a plurality of rotatable rollers for supporting the articles to be transported and a drive belt which is movable below the rollers and provided with driving elements thereon at fixed locations along the length which engage one or more of the rollers during the movement therebeneath in order to provide a controlled driving movement of the rollers for selectively transporting the devices thereover.

In the known gravity-type roller conveyors, the conveyor rollers are driven by means of an endless belt which extends along the underside of the rollers. Such a belt carries a plurality of elongated supporting elements which constantly engage the rollers and provide a driving power which is transmitted to only a few of the conveyor rollers. The intermittent drive of the conveyor rollers produced in this manner serves to reduce the dynamic pressure which builds up when the material to be conveyed piles up in front of a stop for example, at the delivery point. A disadvantage of the known conveyors, is however, that the dynamic pressure increases with the number of piled up objects and the drive belt must be conducted along the rollers to be driven while maintaining relatively small tolerances. It has been suggested that in order to avoid a dynamic pressure build up of the piled up materials, that the belt drive be detached from the rollers. This is done by bringing the drive belt out of contact with the rollers by switching devices actuated by the goods to be transported. In a long gravity roller train this requires considerable technical expenditure.

In accordance with the present invention, there is provided a simple and therefore economical gravity roller conveyor which permits the piling of the material under a much lower dynamic pressure and heretofore. This problem is solved according to the invention by providing drivers which are advantageously of a flexible construction on a conveyor belt and which are dimensioned with longitudinal widths which is shorter than the spacing between successive rollers. The driving elements are made longer in a direction perpendicular to the surface of the belt than the shortest distance between the belt and the rollers in order to provide the resilient interengagement of the drivers with the rollers when they are moved past the rollers. It was found surprisingly, that it is possible to move articles by means of such drivers which are distributed over the length of the driving belt and which touch the driving rollers only briefly. Since the friction accurring between the rollers and the drivers is low there is only a dynamic pressure when the goods are stopped. The drivers may be constructed in the form of upright members which extends substantially perpendicularly or at a slight angle above the conveyor belt or they may be formed as loops which are curved upwardly to a maximum projection from the belt surface at their trailing ends. Since the friction between the drivers and the rollers is relatively low, the loads are gently accelerated when starting from stand still. At the same time, the electric motor which is generally used for driving the driver belt is protected against overloads, for example, when it is necessary to start a conveyor which is already highly loaded.

The conveyor of the invention advantageously includes a section with a braking device in the form of a distance member or braking plate which is shifted upwardly to engage a plurality of adjacent rollers in order to stop their rotation. These braking devices may be used at locations in which the drivers of the rollers also engage with the rollers since the construction of the drivers is such that there is no danger of damage to the drivers or the rollers, nor will there be an essential additional resistance which loads the driving motor.

Accordingly, it is an object of the invention to provide an improved roller conveyor which includes rotatable rollers over which the articles are moved which are selectively driven by driving elements carried on a driving belt, the driving elements having an engagement end which is dimensioned to a longitudinal width which is shorter than a spacing between adjacent rollers.

A further object of the invention is provide a roller conveyor in which the rollers are selectively rotated by driving elements which are made of a resilient material and which bear against the rollers at their peripheries on a side opposite to the load carrying side and which also advantageously includes a braking device in the form of a shiftable distance plate which is movable into engagement with the rollers at one side of the conveyor at a location offset from the driving elements, and which is advantageously selectively actuated by one or more control rollers located at either ahead of and/or behind the braking device.

A further object of the invention is to provide a conveyor system which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
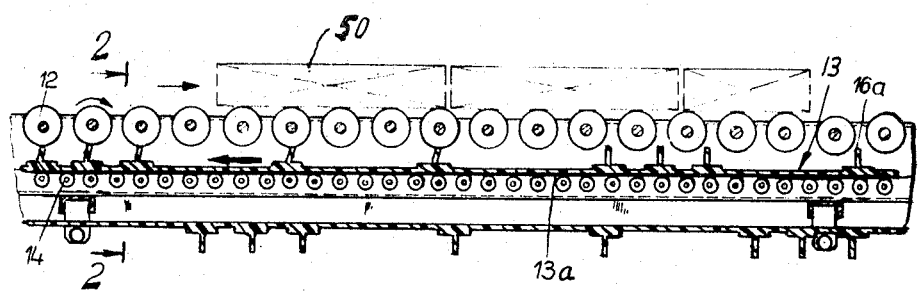
FIG. 1 is a partial longitudinal sectional view of a portion of a conveyor constructed in accordance with the invention.
Figure 2:
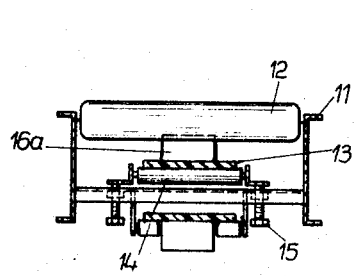
FIG. 2 is a section taken on the line 2—2 of FIG. 1.
Figure 3:
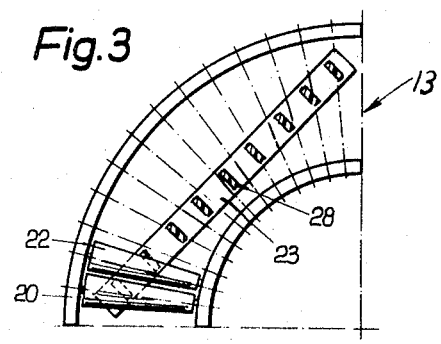
FIG. 3 is a schematic top plan view of a curved section of the roller conveyor indicated in FIG. 1.

Referring to the drawings in particular, the invention embodied therein in FIGS. 1 to 3 includes a gravity-type roller conveyor having a support frame 11 for rotatably supporting a plurality of rollers 12 which are arranged side-by-side and rotatable freely for the purpose of transporting articles 50 thereover. The conveyor includes a drive belt 13 which is operable over a straight section and which carries a plurality of drivers or driving elements 16a at selected spaced locations along its length which may be secured to the belt by means of bolts or screws, etc. The driving elements 16a may be easily replaced or shifted in position along the belt 13. The upper reach 13a of the conveyor belt 13 moves over rollers 14 which can be adjusted in height by means of adjusting screw mountings 15. The driving elements 16a are advantageously made of a resilient material such as a plastic of high wear resistance and they drive rollers 12 from the bottom.

The design and the arrangement of the drivers 16a and the vertical adjustment of the support rollers 14 permit adaptation of the drivers to the nature of the goods which are to be transported and to the maximum admissible dynamic pressures which are to be expected.

The drivers 16a are advantageously arranged in groups to provide selected driving effects. The distance or spacing of the drivers from each other and the spacing between the groups is arranged in accordance with the use to which the particular conveyor is to be employed. The arrangement of the individual drivers in closely spaced relationship in a large group permits the setting in motion of heavy loads of goods, and these goods are thereafter moved along by the individual widely spaced driving elements. The drivers which are employed all include vertically elongated portions such as the drivers 16a in the form of a vane, for example, which may be deflected or bent backwardly as they pass their associated rollers.

A curved section of the conveyor 13 is shown in FIG. 3 which includes a roller track curve 20 with conical rollers 22. A drive belt 23 is arranged below the rollers 2 and is equipped with driving elements 28. The conveyor 23 is arranged along a straight chord through the curve of the roller track.

Figure 4:
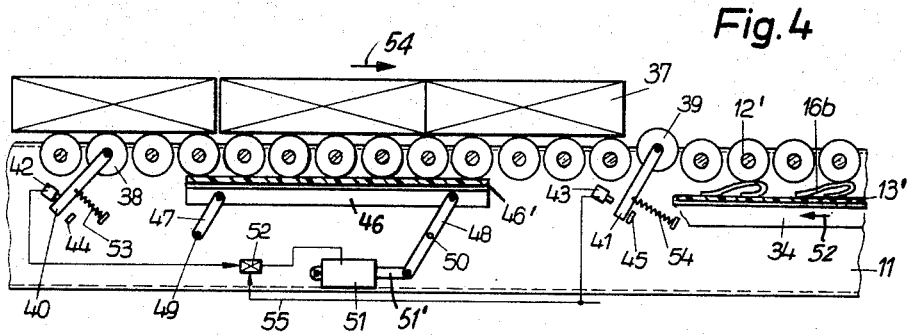
FIG. 4 is a view similar to FIG. 1, but of another embodiment of the invention.
Figure 5:
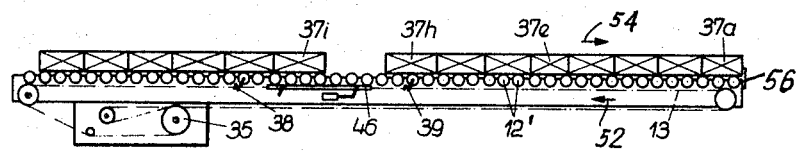
FIG. 5 is a schematic side elevational view of a portion of a conveyor having an operative braking system.

In the embodiment of FIGS. 4, and 5, a drive belt 13' is slidingly guided over an areal support 24 which, for example, may be a wooden or a metal plate and it is driven by an electric motor 25 as shown in FIG. 5. The support 34 is mounted for adjustable vertical movement to permit it to be set at a desired elevation for proper engagement of the driving elements 16b of the conveyor 13 with the associated rollers 12'. The driving motor 35 drives the conveyor belt in the direction of the arrow 52 and the articles or goods 37 are moved in the direction of the arrow 54.

The drivers 16b, which are carried by the drive belt 13', include vertically enlongated loop-shaped portions which extend from a minimum dimension at the forward or front end to a maximum dimension at the rearward end to provide for a gradual interengagement thereof with the associated rollers 12'. The drivers 16b can also comprises tube sections which are secured on the driver belt transverse to the direction of the tube opening. The unique design of the drivers 16b and the fact that the support 34 may be adjusted vertically permits a fine regulation of the driving friction which may be adjusted in accordance with the goods to be transported and to the maximum admissible dynamic pressures to be encountered.

In accordance with a further feature of the invention braking means are associated with the conveyor which are advantageously controlled by one or more switching rollers or control rollers such as the rollers 38 and 39. The rollers 38 and 39 are each mounted so that they are biased by an associated spring 53 and 54, respectively, into a position at which they project above the tops of all of the other rollers. Whenever one of the articles 37 is moved over the associated roller 38 or 39, its associated spring is tensioned and arm 40 and 41 which supports the roller 38 and 39, respectively, is moved into association with a switch 42 or 43 respectively. When the goods 37 move over one or the other of the rollers 38 or 39, they are pressed down into a position at which their surfaces are level with the other rollers as indicated by the positioning of the roller 38 in FIG. 4. The springs 53 and 54, respectively, pull the arms 40 and 41 into an end position against associated stops 44 and 45 respectively, whenever the goods 37 have moved off these rollers.

At the points where the goods 37 are to be piled up, the braking means are provided which correspond to the length of the goods to be transported, or longer than the longest piece of the articles which are to be transported. The braking means comprise a plate or distance piece 46 having a friction plate or covering 46' and it is supported on parallel pivot arms 47 and 48 which pivot about pivot points 49 and 50, respectively. The arm 48 is made longer than the arm 47 and it is secured beyond its pivot to a plunger 51' of a solenoid or an electromagnetic actuator 51. The pressure of the braking plate is so adjusted that its friction force is much greater than that of the drivers 16b and this ensures that the rollers which are located above the friction plate 46' cannot be driven by the drivers 16b. The driving mechanism 51 is connected through a switch box 52 and at least two electrical lines 54 with the associated switches 42 and 43. The switch box 52 contains the elements necessary for actuating the driving mechanism 51 and also if necessary, a time delay device and associated switching elements.

Several braking devices may be arranged over the length of the entire conveyor and one or two switching rollers or control rollers 38 or 39 can be assigned to each braking device. Advantageously one of the control rollers 38 is located ahead of the feed direction and the other 39 is located after the braking device.

Figure 6:
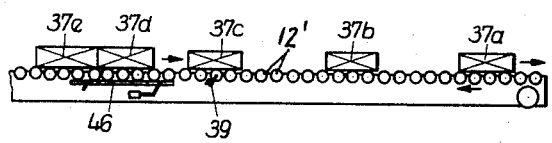
FIG. 6 is a partial view of the device indicated in FIG. 5 showing the manner in which the articles are permitted to accumulate at a braking station.

The piling effect of the gravity roller conveyor can be seen from FIGS. 5 and 6. If a pile of goods is formed at the end of the gravity roller conveyor as indicated in FIG. 5 by a stop 56, the pieces 37a to 37h run up to a block. Since the switching rollers 38 and 29 are actuated, at some times, simultaneously, the braking distance plate 46 becomes effective. The trailing piece 37i comes to a standstill on the rollers 12', braked by the braking plate 46 and it piles up the following pieces. This has the affect that only a limited number of pieces presses against the stop 56.

Selection of the number of articles which are to be grouped together for an isolation of some of the articles can be obtained by varying the intervals between the stop 56 and the braking means in the form of the distance plate 46. With the control of this nature the braking effect is cancelled as soon as one or both switching rollers are free. The switches 42 and 43 may be combined to control the driving mechanism 51 in such a way that the braking distance plate 46 is brought into engagement when, and as long as, both of the two switching rollers 38 or 39 are engaged by the movement of an article 37 thereover.

In FIG. 6, there is shown a section of the roller conveyor on which pieces 37a to 37e are arranged. The pieces 37a, 37b, and 37c move to the right separated by intervals from each other. In order to prevent the following pieces 37d and 37e from moving too close together the braking distance plate 46 is actuated so that the respective rollers no longer turn and the pieces 37d and 37e come to a stop. In this arrangement, the braking distance plate 46 is pressed against the rollers as soon as the switching roller 39 is pressed down. This has the result that the pieces can only pass individually into the braking zone.

Several driving belts can be arranged side-by-side or several drivers can be arranged side-by-side on a wide driving belt if desired. Separate intermediate rollers driven by the drive belt can also be arranged under the freely rotating rollers which can serve as driving wheels for the freely rotating rollers. In addition, the gravity roller conveyors can also be designed as a caster track. To this end, the drivers 16 must extend over the entire width of the caster track.

What is claimed is:

1. A gravity-type roller conveyor comprising rotatable rollers over which articles are to be moved, support means for said rollers for rotatably supporting said rollers at spaced locations along a defined trackway, a drive belt movable adjacent the bottom side of said rollers, a flexible driver on said drive belt movable with said belt and engageable with said rollers thereby to rotate them, said driver being dimensioned to extend above said belt beyond the bottoms of at least some of said rollers in order to drivingly engage said rollers and having an outer roller engagement surface which is shorter in the driving direction than the spacing between adjacent rollers, said drivers being shaped in the form of a vane.

2. A gravity-type roller conveyor comprising rotatable rollers over which articles are to be moved, support means for said rollers for rotatably supporting said rollers at spaced locations along a defined trackway, a drive belt movable adjacent the bottom side of said rollers, a flexible driver on said drive belt movable with said belt and engageable with said rollers thereby to rotate them, said driver including vertically elongated bendable portions being dimensioned to extend above said belt beyond the bottoms of at least some of said rollers in order to drivingly engage said rollers and having an outer roller engagement surface which is shorter in the driving direction than the spacing between adjacent rollers.

3. A gravity-type roller conveyor, according to claim 2, wherein said driver includes a vane-like element having a cross section which decreases toward the direction of movement of said belt.

4. A gravity-type roller conveyor, according to claim 2, wherein said driver is loop-shaped.

5. A gravity-type roller conveyor, according to claim 2, including a drive belt support arranged beneath said drive belt for supporting said belt during its movement below said rollers.

6. A gravity-type roller conveyor, according to claim 5, including means for adjustably positioning said drive belt support.

7. A gravity-type roller conveyor, according to claim 5, wherein said support comprises a plurality of rollers spaced longitudinally beneath said drive belt.

8. A gravity-type roller conveyor, according to claim 2, including a plurality of drivers arranged along the length of said belt, and means for securing said drivers on said belt.

9. A gravity-type roller conveyor, according to claim 8, wherein said drivers are arranged at equal intervals along said belt.

10. A gravity-type roller conveyor, according to claim 8, wherein said drivers are arranged at unequal intervals along the length of said belt.

11. A gravity-type roller conveyor, according to claim 8, wherein said drivers are arranged in separated groups along the length of said drive belt.

12. A gravity-type roller conveyor, according to claim 8, wherein said drivers are arranged at s spacing which is different from the spacing of said rollers.

13. A gravity-type roller conveyor, according to claim 8, wherein there are a plurality of drivers arranged in separated groups, said groups being composed of a number of drivers which is different from the number of rollers arranged in a comparable spacing.

14. A gravity-type roller conveyor, according to claim 8, including at least two drive belts arranged beneath said rotatable rollers and arranged side-by-side.

15. A gravity-type roller conveyor, according to claim 2, wherein said trackway comprises a curved trackway said drive belt being arranged on a chord of said curved trackway.

16. A gravity-type roller conveyor, according to claim 15, wherein said rollers of said roller track curve are conical.

17. A gravity-type roller conveyor, according to claim 2, including braking means associated with said rollers comprising a distance plate supported below said rollers, and control means for shifting said distance plate into engagement with said rollers to stop the rotation thereof in accordance with the position of the goods on said trackway.

18. A gravity-type roller conveyor, according to claim 17, wherein said control means includes a roller of said rotatable rollers which project above all of the other rollers and including means for mounting said projecting roller to permit downward movement thereof by the article passing thereover to shift said braking distance member.

19. A gravity-type roller conveyor, according to claim 18, wherein said control means includes a plurality of control rollers arranged along said trackway which projects outwardly from the other of said rollers and which are engageable by the article moving thereover to provide a control actuation of said braking distance member.

20. A gravity-type roller conveyor, according to claim 19, wherein at least two of said control rollers are provided for the controlling the movement of said distance plate one arranged on one side thereof and the other arranged on the opposite side thereof.

21. A gravity-type roller conveyor, according to claim 20, wherein said control means also includes electrical circuit means connected to each of said rollers for selectively shifting said distance plate member.

22. A gravity-type roller conveyor, according to claim 21, including switching delay means arranged in said electrical circuit for delaying the operation of said movement of said distance plate member.

23. A gravity-type roller conveyor, according to claim 17, wherein said braking distance plate has at least the length of the longest piece of goods to be transported on the roller conveyor.

* * * * *